Patented Dec. 12, 1933

UNITED STATES PATENT OFFICE 1,938,999

RETARDATION OF RANCIDITY IN VEGETABLE FOOD-STUFFS

Edwin Cox, Richmond, Va., assignor to Phosphate Products Corporation, Richmond, Va.

No Drawing. Application May 7, 1930, Serial No. 450,597. Renewed March 14, 1933

6 Claims. (Cl. 99—11)

This application which is a continuation-in-part of my application, Serial No. 392,246, filed September 12, 1929, relates to rancidity in cereals and other vegetable food-stuffs, and the object of the invention is in general, to provide for the inhibition or retardation of such rancidity.

One of the specific objects of the invention is to provide a rancidity inhibiting or retarding agent to be mixed or incorporated with the food-stuff or with which the food-stuff is to be treated.

Another object of the invention is to provide a rancidity inhibitor having such characteristics that in the reaction involved in the inhibition or retardation of the rancidity, the agent itself becomes changed into a nutrient concomitant of the food-stuff with which it is assimilated.

Still another object of the invention is the provision as a new edible composition, of a cereal product having an oxidizing ingredient in the interest of color through the presence of which the susceptibility of the product to rancidity is enhanced, and a counter-acting reducing ingredient.

Another object of the invention includes the process for making such new edible composition.

Other objects of the invention will appear as the following description proceeds.

Before adverting to the description of the invention, it may be stated that rancidity is the unnatural presence of odoriferous products of oxidation and decomposition of fats and oils, and that rancidity is believed to be due to the oxidation of the glycerides, the mal-odor being caused by the formation of aldehydes or ketones or like odoriferous bodies.

Rancidity may be produced by any one or more of several causes. Natural oxidation of the glycerides may occur by the exposure of the products to air and light in the presence of moisture. Artificial oxidation such as is sometimes used in the preparation of certain cereal products for example, the bleaching of flours, may greatly accelerate the development of rancidity or when carried to a degree of excess, such oxidation may be the primary cause of rancidity. Biological infection produced either through bacteriological or enzymatic action may also be a primary cause of rancidity.

I have found that acid salts materially accelerate rancidity and that the acid products formed incidental to the decomposition of the food-stuffs accelerate the development of rancidity. In many instances, rancidity appears to be caused by auto-oxidation which means that while the primary cause may initiate rancidity of normally slow development, yet the resulting acid decomposition products may speed the development of the rancidity.

In detail the mechanics of rancidity are considered to follow the following general course. Fats, oils and like material are compounds of organic acids and alcohols. Either series might be unsaturated, however, this usually applies to the acid portion of the compound, and hardly ever to the alcohol. In general the alcohol and, therefore, positive portion of the compound, is the trihydric alcohol glycerine. The acid constituents vary materially throughout the range of the paraffin as well as olein, acetylene and other unsaturated series, also combinations of these fatty acids exist in compounds that are susceptible to rancidity, such as lecithin, a chloline ester. Upon being submitted to oxidation, the unsatisfied valences of the compounds tend to combine with the oxygen, forming series of compounds termed perozonides, which tend upon formation to be further oxidized, breaking the chain and resulting in the formation of the series of odoriferous aldehydes and ketones, which give rise to the rancid odor, such as oenanthaldehyde, acrolein-hydrogen peroxide and so on.

The structural formulæ below indicate these reactions:

1. An unsaturated chain compound

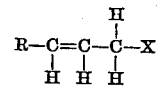

Oxygen enters the unsaturated chain compound

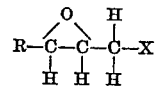

Further oxidation causes the split

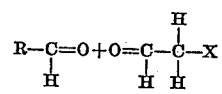

These are typical only, and any aldehyde may be developed.

2. Unsaturated chain compound

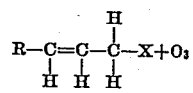

Ozone enters

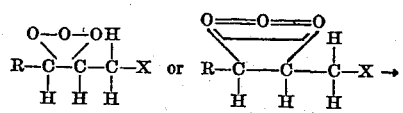

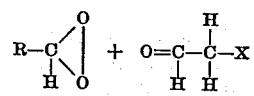

Therefore, when rancidity occurs through oxidation, the chain compound is broken at the point of the double bond, or at the point of a double bond, and aldehydes or the compounded ketones appear, accompanied by the development of a free fatty acid though obviously not proportional. Also the oxidation of the glyceryl radical to the aldehyde is possible.

One of the important applications of the invention is in increasing the resistance to rancidity of bleached or artificially oxidized cereal products of which flour may be taken as an example.

In the bleaching of flour, the purpose is to oxidize the carotin ($C_{40}H_{56}$), the primary pigment of flour and for the purpose of effecting this oxidation certain bleaching agents are in general use, among these being nitrogen trichloride, nitrosylchloride, nitrogen peroxide, benzoyl peroxide and chlorine gas. Each of the bleaching agents mentioned are strong oxidizing agents. In none of the instances is the oxidation selective so that whenever an oxidizing bleach is used, oxygen is rendered available to go into reaction both with the carotin and with the glycerides as well. Consequently, the bleaching of a cereal product renders it more susceptible to rancidity than the same product would be without the bleaching, and if the bleaching is carried to excess the high oxidizing effect of the bleaching agent may be the primary cause of the rancidity.

It is in general desirable to add the anti-oxidant when the desired color value has been approached, for anti-oxidants are not instantaneous in their reaction and it is advantageous that by the time the color value has been reached, the anti-oxidant shall already have progressed in its reducing effect upon the bleaching agent.

Since rancidity appears to be caused or accompanied by oxidation of the esters of the fatty acids, I conceived the idea of combating rancidity by means of a reducing agent. Numerous experiments were tried and it was found that rancidity in any food product in which rancidity may occur and that includes all food products having constituent fats or oils, could be controlled, that is to say, inhibited or retarded by a reducing agent. Experiments showed that certain specific substances were efficient reducers in preventing oxidation of the glycerides; hydroquinone, quinhydrone, resorcinol, pyrocatechol, adrenaline, phenylhydroxylamine, hexahydroxybenzene, phloroglucinol, hexamethylenetetramine, pyromucic acid and cyclohexane, thus representing the general line of organic chemical reducing agents.

Quantitative experiments were made to determine the exact results when certain typical reducing agents were employed, and it was found for instance, that a wheat flour heavily bleached, to which was added for the purpose of further accelerating its rancidity 5% ferrous sulphate, turned rancid in three weeks. The same flour treated in the same way with the further addition of .05% hydroquinone was sound at the end of eight weeks.

A wheat flour heavily infected with oxidizing organisms and mixed with self-rising ingredients, which are also oxidizing in nature, turned very rancid in eight weeks. The same flour treated in the same way with the further addition of .1% hydroquinone was sound at the end of eight weeks.

It was conclusively shown that hydroquinone as well as a number of other organic derivatives could be relied upon even in small proportional quantities to control rancidity, but a number of factors enter into the practicability of the adaptation of any reducing agent to this particular purpose among which are the non-toxicity of a reducing agent, its cost, and its effect upon the flavor of the product. While hydroquinone in the very small quantities mentioned in the above tests and in fact in much larger proportionate quantities is entirely harmless for human consumption, yet the fact that hydroquinone is inherently toxic renders its use non-feasible for psychologic, if for no other reasons.

Questions of cost also materially restrict the field of practical reducing agents and since the majority of food-stuffs to which the anti-oxidant would be applied are very low priced, the agent must have a very low cost.

Further experimentation led to the selection of hydroxybenzoic acids and their like compounds, of which O-hydroxybenzoic acid (salicylic acid) is a specific example. This is a product related to hydroquinone, but in amounts much larger than would be used for the purpose, it is non-toxic, it breaks down into products that are easily eliminated, and its continuous use would therefore, not be harmful. It was effective in amounts as small as .01% in retarding rancidity in every type of food-stuff in connection with which it was tested namely, mayonnaise, vegetable oil, lard, butter, meal, flour and nut meal.

In view of developing other retarders which would obviate the practical difficulties above mentioned, experiments were carried into inorganic compounds, and the field of useful reducing agents was found in general to include compounds of the elements, sulphur, phosphorus, etc.

Phosphorus and sulphur are of particular interest because of the combinations that can be effected between the atoms themselves. The compounds of phosphorus and sulphur also meet the above specifications with regard to non-toxicity, and low cost, and the phosphorus compounds meet the third specification, that there shall be no effect upon the odor or flavor of the product to which they are applied. While some sulphur compounds meet this condition satisfactorily, there are others which will unfortunately give rise in the product to a non-normal odor.

Those compounds in particular which proved to be the most satisfactory reducers are the phosphites, hypophosphites, thiophosphates and other unsaturated phosphorus compounds, since in the reaction involved in uniting with the oxygen in the product, these substances become phosphates which are desirable nutrients in the diet of both animals and humans.

In the process of preparing a decolored non-rancidifying cereal product such, for instance, as bleached flour, conditions must be provided either for selective oxidation, or the bleach must be permitted to work before the addition of the reducing agent so that the oxidant will not itself, become reduced before it has served its purpose.

In carrying out the process it is preferred first to treat the cereal product with any one of the commonly used bleaches as listed in an earlier paragraph of this specification or with the at present, less well known and newer bleaches such as the oxidase enzymes. When the carotin has been decolored to the desired extent the reducing agent is then added and if an unsaturated compound of phosphorus is used, the quantity is immaterial provided that it is at least sufficient to suppress or retard to the desired degree the oxidation of the fatty acid esters of the cereal.

One has the assurance that to such extent as the oxidation of the reducing agent does take place, the product is enriched by the formation of nutrient phosphate and whatever excess of reducing agent remains in the product, is entirely innocuous.

The scope of the invention includes the making, using and vending of the rancidity retardant per se, predicated upon the fact that the effect of a non-toxic reducing agent, and particularly an unsaturated compound of phosphorus is an absolutely new and hitherto inobvious result.

Since it is a common practice with millers to enhance the value of their product by incorporating with it a proportion of calcium acid phosphate or to add self-rising ingredients, which in general, include mono-calcium phosphate, the invention also includes the application of the rancidity retardant in mixture with the calcium acid phosphate or with the self-rising ingredients. It cannot be considered as a foreign body in the finished flour, for in the proper proportion, it becomes as previously stated, a phosphate ingredient of the final product.

In summary it may be stated that while the development of rancidity in natural flours is relatively slow, the addition of a phosphate as an enricher, a bleach, or a self-rising ingredient, enhances the rancidity susceptibility of the product to such an extent that the inhibition of the rancidity becomes a vital problem.

While I have in the above description endeavored to disclose what I believe to be preferred and practical concepts of my invention, it is to be understood that the particular reducing agents disclosed, and the particular substances with which they are associated or the food-stuffs in conjunction with which they are employed are to be considered by way of example only, and not limitative in their bearing upon the invention.

Having thus described my invention, what I claim is:

1. A bleached rancidity resistant cereal foodstuff comprising in mixture a cereal product and combinations of phosphorus, comprising a phosphate and a reducing salt the proportion of the latter being such that it is eventually oxidized into a phosphate, in the reducing reaction.

2. The process of fortifying against rancidity a cereal or other vegetable food-stuff, the susceptibility of which to rancidity has been increased incident to the addition thereto of phosphate as an enriching ingredient, comprising adding to the enriched food-stuff a compound of phosphorus selected from the following group: phosphite, hypophosphite, hypophosphate.

3. Self-rising cereal food-stuff comprising in addition with a cereal product, self-rising ingredient including mono-calcium phosphate, and a compound of phosphorus selected from the following group: phosphite, hypophosphite, hypophosphate, for decreasing the rancidity susceptibility which the mono-calcium phosphate ingredient has enhanced.

4. Foodstuff, fortified against rancidity and boosted in nutrient value including in mixture with the foodstuff a phosphate, and another compound of phosphorus selected from the following group: phosphite, hypophosphite, hypophosphate, for decreasing the rancidity susceptibility which has been enhanced by the phosphate ingredient.

5. Process for producing a bleached non-rancidifying foodstuff comprising treating the foodstuff with an oxidizing bleach, and when the desired color value has been approached, treating the foodstuff with a reducing agent in quantity sufficient to persist as a reducing agent beyond the conclusion of the bleaching reaction for inhibiting the tendency to rancidity incited by the bleach.

6. Process for producing a bleached non-rancidifying foodstuff comprising treating the foodstuff with an oxidizing bleach, and when the bleach has proceeded as far as desired, treating the foodstuff with an anti-oxidant in quantity sufficient to persist as an anti-oxidant beyond the conclusion of the bleaching reaction for inhibiting the tendency to rancidity incited by the bleach.

EDWIN COX.